United States Patent [19]

Tanaka et al.

[11] Patent Number: 4,620,424
[45] Date of Patent: Nov. 4, 1986

[54] METHOD OF CONTROLLING REFRIGERATION CYCLE

[75] Inventors: Tatsuo Tanaka, Fuji; Koichi Miyazaki, Shizuoka; Eiji Kuwahara; Masaya Yamazaki, both of Fuji; Keiichi Morita, Fujinomiya, all of Japan

[73] Assignee: Kabushiki Kaisha Toshiba, Kawasaki, Japan

[21] Appl. No.: 686,673

[22] Filed: Dec. 27, 1984

[30] Foreign Application Priority Data

Dec. 28, 1983 [JP] Japan ................................ 58-245174

[51] Int. Cl.$^4$ ................................................ F25B 41/04
[52] U.S. Cl. ................................................ 62/222
[58] Field of Search ................ 62/204, 205, 206, 210, 62/211, 212, 217, 222, 223, 224, 225

[56] References Cited

U.S. PATENT DOCUMENTS

| | | | |
|---|---|---|---|
| 2,453,439 | 11/1948 | Hubbard | 62/222 |
| 4,420,947 | 12/1983 | Yoshino | 62/228.4 |
| 4,459,818 | 7/1984 | Kaya et al. | 62/224 X |
| 4,523,435 | 6/1985 | Lord | 62/225 X |

FOREIGN PATENT DOCUMENTS 245174 11/1979 Japan.

Primary Examiner—Harry Tanner
Attorney, Agent, or Firm—Cushman, Darby & Cushman

[57] ABSTRACT

In a method of controlling a refrigeration cycle constructed by connecting a compressor, an outdoor-side heat exchanger, an expansion valve, and an indoor-side heat exchanger, the temperature of a coolant ejected from the compressor is detected by a sensor, and the opening rate of the valve is adjusted in accordance with the detected temperature. When the detected temperature exceeds a prescribed upper limit, that opening rate of the valve which is indicated on that occasion is stored in a memory, and then the opening rate of the valve is increased to reduce the temperature of the ejected coolant to a lower level than a prescribed lower limit. After the temperature decreases from the lower limit, the opening rate of the valve is adjusted to a larger level than that level which is previously stored in a memory by a prescribed extent, thereby keeping the temperature of the ejected coolant between the upper and lower limits.

9 Claims, 7 Drawing Figures

METHOD OF CONTROLLING REFRIGERATION CYCLE

BACKGROUND OF THE INVENTION

This invention relates to a method of controlling a refrigeration cycle applied in, for example, an air conditioner and, more particularly, to a method of controlling the opening degree of an expansion valve built in the refrigeration cycle.

A refrigeration cycle used with, for example, an air conditioner is generally constructed by connecting a compressor, 4-way valve, outdoor-side heat exchanger, decompression unit and indoor-side heat exchanger in the order mentioned. With this type of refrigeration cycle, a coolant, sent from the compressor while being held at a high temperature and a high pressure when cooling a room, flows into the outdoor-side heat exchanger through the 4-way valve and then condenses. After being decompressed in the decompression unit, the coolant is evaporated in the indoor-side heat exchanger and brought back to the compressor. When the room is heated, the operation of the 4-way valve is changed over, causing the coolant to flow in a cycle opposite to the room-cooling cycle. Namely, when heating a room, a high temperature and a high pressure coolant sent from the compressor is first condensed in the indoor heat exchanger and then decompressed by the decompression unit. After evaporation in the outdoor heat exchanger, the coolant is returned to the compressor.

Recently, an electromotive expansion valve has been applied as a decompression unit. The opening degree of this expansion valve is controlled to regulate the operation of the refrigeration cycle.

The adjustment of the opening degree of this electromotive expansion valve controls the temperature of a coolant ejected from the compressor. If, however, the refrigeration cycle is subjected to a tremendously heavy load with respect to a particular opening degree of the expansion valve, a sharp rise takes place in the temperature at which the coolant is ejected from the compressor. This event leads to a decline in the insulation of the winding of the compressor motor, or the property of a lubrication oil held in the compressor and, consequently, in the reliability of a refrigeration cycle.

SUMMARY OF THE INVENTION

This invention has been accomplished in view of the above-mentioned circumstances and is intended to provide a refrigeration cycle-controlling method which can immediately set the opening degree of an electromotive expansion valve at a level corresponding to the load of the refrigeration cycle, thereby elevating its reliability.

To attain the above-mentioned object, this invention provides a refrigeration cycle-controlling method which comprises the steps of:
detecting a load imposed on the refrigeration cycle;
adjusting the opening degree of an expansion valve in conformity to the detected load;
when the detected load exceeds a prescribed upper limit, storing in a memory that opening degree of the expansion valve which occurs on this occasion and increasing the opening degree of the expansion valve, thereby to reduce the load to a prescribed lower limit; and
after the detected load decreases from the prescribed lower limit, adjusting the opening degree of the expansion valve to a larger level than the stored level by a prescribed extent, thereby keeping the load of the refrigeration cycle between the upper and lower limits.

As described above, the refrigeration cycle-controlling method of this invention is characterized in that when the refrigeration cycle undergoes an excessively heavy load, the opening degree of the expansion valve is first enlarged to reduce the load to a lower level than a prescribed lower limit and then gradually increased; therefore, the opening degree of the expansion valve can be immediately set at a level corresponding to the load of the refrigeration cycle, thereby preventing, for example, damage to the compressor and elevating the reliability of the refrigeration cycle.

BRIEF DESCRIPTION OF THE DRAWINGS

FIG. 3A is a diagram showing changes over a period of time in the temperature of the coolant at which it is ejected from the compressor, and FIG. 3B is a diagram indicating changes over a period of time in the opening rate of the expansion valve;

DETAILED DESCRIPTION OF THE PREFERRED EMBODIMENT

Figure 1:
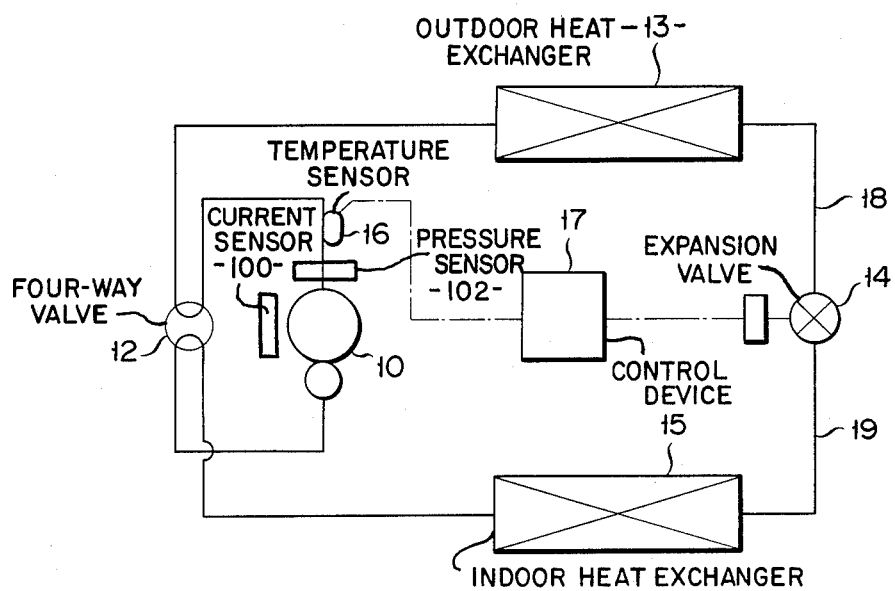
FIG. 1 is a plan view of a refrigeration cycle whose operation is controlled by a method embodying this invention.

A description may now be made with reference to the appended drawings of a rerigeration cycle-controlling method embodying this invention. FIG. 1 schematically shows a refrigeration cycle whose operation is controlled by a method embodying this invention. This refrigeration cycle comprises a compressor 10 whose capacity is made changeable, a 4-way valve 12, an outdoor-side heat exchanger 13, an electromotive expansion valve 14 and an indoor-side heat exchanger 15, all connected in the order-mentioned. At the ejecting side of the compressor 10 is arranged a temperature sensor 16 for detecting the temperature of a coolant ejected from the compressor. Data on the temperature detected by the temperature sensor 16 is supplied to a control device 17. This control device 17 adjusts the opening degree of the expansion valve 14 in accordance with the level of the detected temperature.

Figure 2:
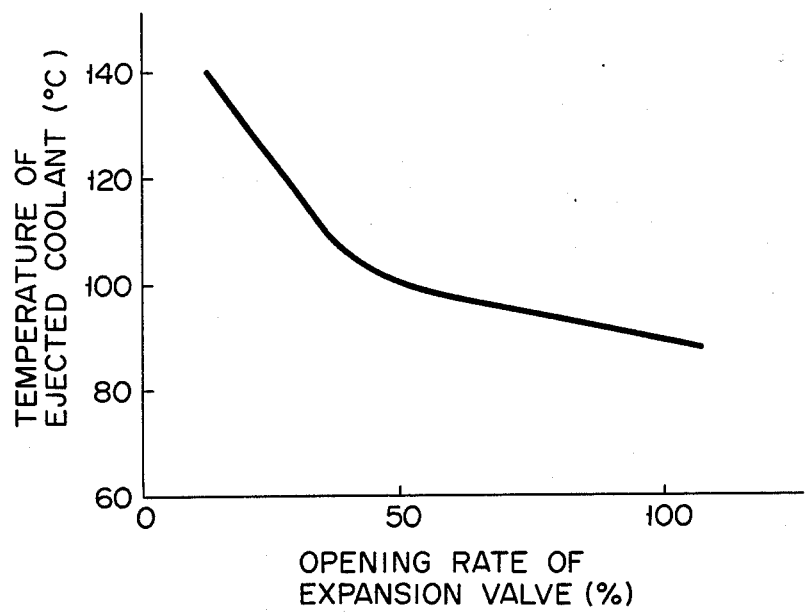
FIG. 2 is a curve diagram showing the relationship between the opening degree of an expansion valve and the temperature of a coolant ejected from a compressor when the refrigeration cycle undergoes a particular load.

When a constant load is imposed on the refrigeration cycle, the temperature at which a coolant is ejected from the compressor changes with the opening degree of the expansion valve 14. Namely, as seen from FIG. 2, a small opening degree of the expansion valve 14 leads to a high temperture of the coolant ejected from the compressor 10, while a large opening degree of the expansion valve 14 results in a decline in the temperature of the ejected coolant.

Normally, when the temperature of the coolant ejected from the compressor 10 exceeds 100° C., deterioration takes place in the property of an insulation material coating the winding of a compressor motor, or the quality of a lubricant held in the compressor 10. When the temperature of the coolant sent from the compressor 10 is not kept higher than a certain level, the refrigeration cycle loses efficiency. Therefore, it is necessary to control the opening degree of the expansion valve 14 in such a manner that the temperature of the coolant ejected from the compressor 10 does not exceed 100° C. as an upper limit level, but is kept at a higher level than a lower limit.

A detailed description may now be made with reference to FIGS. 3A and 3B of the method of controlling the opening degree of the expansion valve 14. FIG. 3A indicates changes over a period of time in the temperature of a coolant ejected from the compressor 10. FIG. 3B shows changes over a period of time in the opening degree of the expansion valve 14, which corresponds to the temperature of the ejected coolant. Now let it be assumed that the upper limit a of the temperature of the ejected coolant is set at 100° C., and the lower limit b of the temperature is set at 95° C. Further, it is supposed that during the initial operation of the refrigeration cycle, the opening degree of the expansion valve 14 is set at a level A by the control device 17.

When the refrigeration cycle undergoes a tremendously heavy load at the opening degree A of the expansion valve 14, the temperature of the coolant ejected from the compressor 10 sharply rises to a higher level than the upper limit a. Then the temperature sensor 16 detects the temperature. A signal denoting the detected temperature is delivered to the control device 17, which in turn causes a 100% opening of the expansion valve 14. At this time, the control device 17 stores data on the opening degree A of the expansion valve 14 before it is fully opened, that is, the opening degree A when the temperature of the ejected coolant exceeds the upper limit a. When the expansion valve 14 is fully opened, the temperature of the ejected coolant begins to drop after making an overshoot of 2 to 3 degrees. When the temperature of the ejected coolant falls below the lower limit b, the control device 17 adjusts the opening degree of the expansion valve 14 to a level (A+α), that is, a level broader by α (for example 10%) than the opening degree previously stored in the control device 17. As a result, the temperature of the ejected coolant rises over the lower limit b. When, however, the temperature of the ejected coolant exceeds the upper limit a, even by causing the expansion valve 14 to be opened at the degree of (A+α), the control device 17 lets the expansion valve 14 fully opened again, thereby causing the temperature of the ejected coolant to fall below the lower limit b, and thereafter, adjusts the opening degree A of the expansion valve 14 to a level (A+2α) arrived at by further enlarging the aforementioned opening degree A by an extent of 2α. Later, the control device 17 repeats the above-mentioned operation until the temperature of the ejected coolant is kept at a level between the upper limit a and lower limit b, thereby immediately determining a controlled opening degree B adapted for the load of the refrigeration cycle.

The electromotive expansion valve 14 built in the refrigeration cycle well serves the purpose, provided its opening degree can be adjusted by a signal issued from the control device 17. For instance an electromotive expansion valve shown in FIG. 4 may be applied. This expansion valve 14 comprises a valve body 21 in which a valve port 20 is formed. The valve body 21 is connected to the outdoor-side heat exchanger 13 through an influx tube 18 and also to the indoor-side heat exchanger 15 through an efflux tube 19. The influx tube 18 and efflux tube 19 communicate with each other through the valve port 20. A valve rod 23, allowing for the opening and closing of the valve port 20, is movably supported in the valve body 21 by a diaphragm 22. A movable driver 25 is threaded concentrically with the valve rod 23 in the upper portion of the valve body 21. A ball 24 is provided between the driver 25 and valve rod 23. A step motor 26 is fitted to the upper part of the valve body 21. The output shaft 27 of the step motor 26 is connected to the driver 25. When an output signal from the control device 17 is supplied to the expansion valve 14, the output shaft 27 of the step motor 26 is rotated to let the driver 25 move back and forth and to cause the valve rod 23 to be reciprocated by means of the ball 24 and diaphragm 22. The valve rod 23 broadens or narrows the coolant passage area of the valve port 20 to a desired extent.

Figure 4:
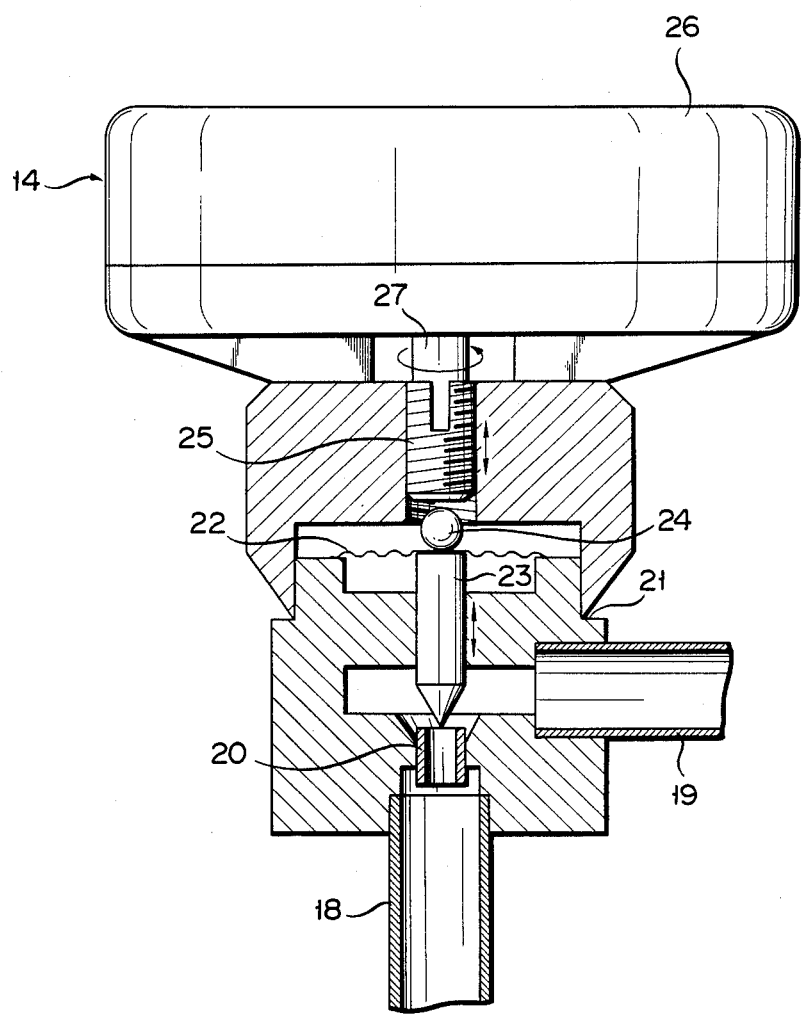
FIG. 4 is a sectional view of an electromotive expansion valve built in the refrigeration cycle.

Referring to the electromotive expansion valve 14 of FIG. 4, the lower end portion of the valve rod 23 is made into a round conical shape. The flow rate of a coolant (the opening degree of the expansion valve) corresponding to the reciprocation of the valve rod 23 is changed substantially linearly. For instance, when the opening degree of the expansion valve 14 is progressively broadened at the increment of α, signals having the same pulse number are supplied to the step motor 26 to effect the movement of the valve rod 23 to the same extent. However, the relative positions of the valve rod 23 and valve port 20 tend to indicate variations due to the manufacturing errors, thereby sometimes making it impossible to obtain the desired opening degree of the expansion valve 14 even by progressively broadening the opening degree at an increment of α.

Figure 3:
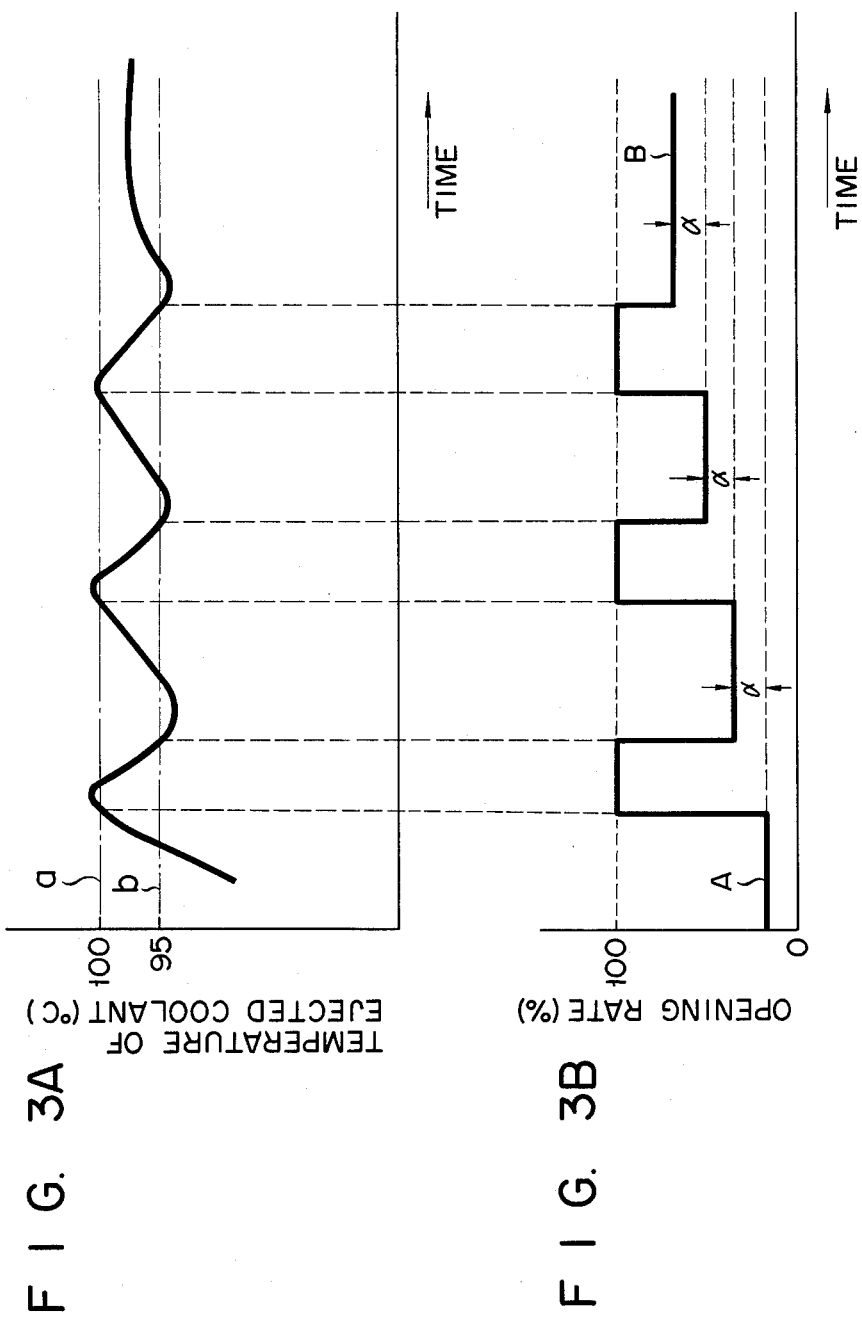
FIGS. 3A and 3B jointly illustrate the refrigeration cycle-controlling method of this invention.
Figure 5:
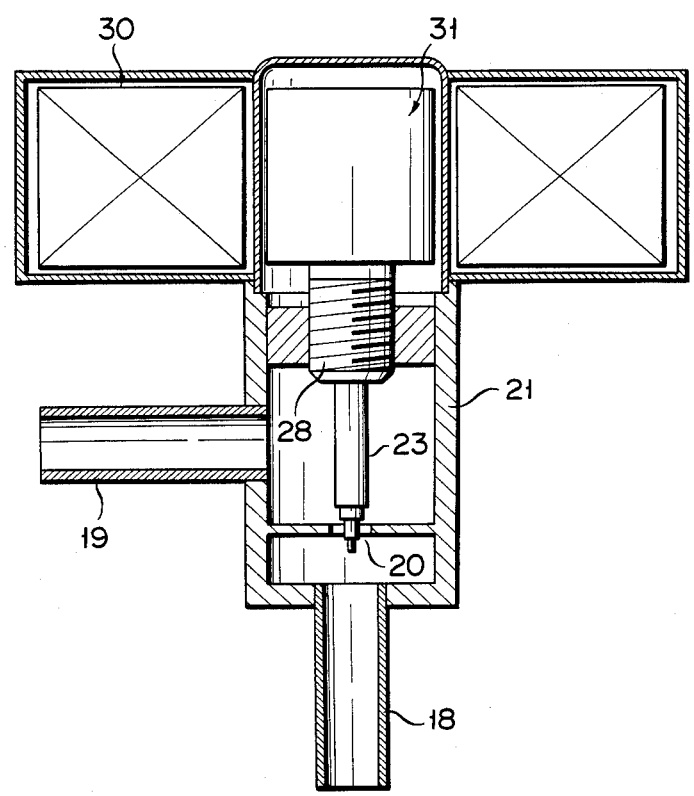
FIG. 5 is a sectional view of another electromotive expansion valve.
Figure 6:
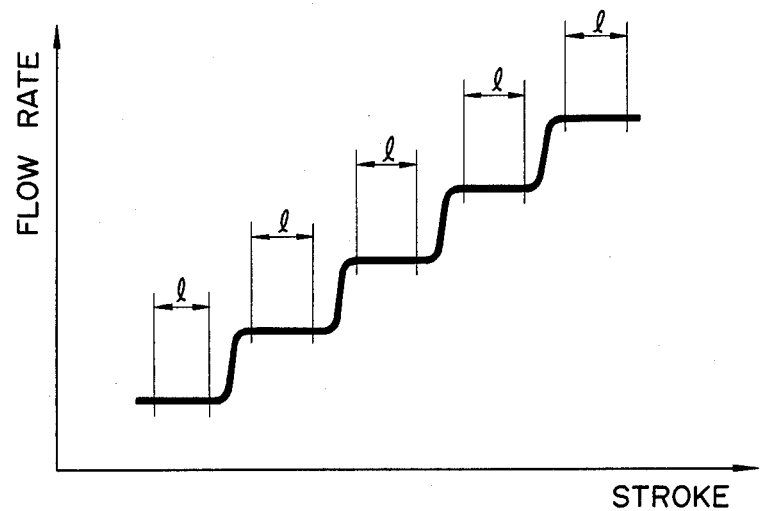
FIG. 6 illustrates the relationship between the valve rod stroke and the coolant flow rate in the expansion valve of FIG. 5.

FIG. 5. shows an electromotive expansion valve assigned to resolve the above-mentioned difficulties. A valve rod 23 is threaded in a screwed portion 28 formed in a valve body 21. The upper portion of the valve rod 23 is connected to a rotor 31 which is rotated by a stator coil 30. The lower end portion of the valve rod 23 is formed of the stepped sections whose diameters are progressively reduced toward the lower end thereof. Therefore, when the lower end portion of the valve rod 23 is moved into or removed from a valve port 20, the coolant passage area defined by the valve rod 23 and valve port 20 is changed stepwise. Consequently, the coolant passage characteristic of the expansion valve 14 stepwise varies with the stroke of the valve rod 23 as illustrated in FIG. 6. If, therefore, in case the opening degree of the expansion valve 14 is progressively broadened at an increment of α, as illustrated in FIG. 3, the diameters of the respective stepped sections of the valve rod 23 are so defined as to cause the opening degree of the expansion valve 14 to be progressively changed at the degree of α; then, the same flow rate of a coolant is ensured while the respective stepped portions of the valve rod 23 are moved by a stroke α, that is, to an extent corresponding to the height of the respective stepped portions of the valve rod 23. Therefore, the expansion valve of FIG. 5 offers the advantage that even if some errors take place in manufacturing an expansion valve, the opening degree of the expansion valve can be correctly increased stepwise by a specific equal extent or any optional extent.

The aforementioned refrigeration cycle-controlling method of this embodiment is characterized in that when the load of the refrigeration cycle, for example, the temperature of a coolant ejected from the compressor exceeds a prescribed level, first the expansion valve is fully opened, and then the opening rate of the expansion valve is progressively increased over the opening degree attained before the full opening of the expansion valve at an increment of $\alpha$, thereby ensuring a proper opening degree for the current load of the refrigeration cycle. Even when, therefore, the refrigeration cycle undergoes a tremendously heavy load, the temperature of the coolant ejected from the compressor is prevented from unduly rising; consequently, it is possible to avoid the damage of the compressor and the deterioration of the quality of a lubricant, thereby elevating the reliability of the refrigeration cycle.

This invention is not limited to the above-mentioned embodiment, but is applicable with various modifications without departing from the object and scope of the invention. For instance, the foregoing embodiment utilized the temperature of a coolant ejected from the compressor as a means for detecting the load of a refrigeration cycle. Instead, it is possible to detect the load of the refrigeration cycle by determining the magnitude of an electric current conducted through the compressor motor using current sensor 100 or the pressure of a coolant ejected from the compressor by pressure sensor 100. The aforementioned embodiment refers to the case where, when the refrigeration cycle is subjected to a tremendously heavy load for the opening degree A of the expansion valve, the valve is fully opened. Instead, any opening degree of the expansion valve well serves the purpose, provided it helps to reduce the load of the refrigeration cycle. Further, the above described embodiment refers to the case, where the opening degree of the expansion valve is progressively elevated from level A to level B at an increment of $\alpha$. Instead, the opening rate may be progressively increased by different extents.

What is claimed is:

1. A method of controlling a refrigeration cycle in an apparatus including a compressor, an outdoor-side heat exchanger, an electromotive expansion valve, and an indoor-side heat exchanger which are connected in the order mentioned; said method comprising the steps of:
    detecting a load of the refrigeration cycle;
    adjusting an opening degree of the expansion valve in accordance with the magnitude of the detected load;
    storing in a memory a loaded opening degree of the expansion valve which is indicated when the detected load exceeds a prescribed upper limit;
    increasing the opening degree of the expansion valve to a predetermined upper level opening degree which is larger than said loaded opening degree in said storing step, to reduce the load of the refrigeration cycle to a level which is lower than a prescribed lower limit; and
    after the load of the refrigeration cycle decreases below the lower limit, decreasing the opening degree of the expansion valve to an opening degree which is larger than said loaded opening degree by a prescribed extent, and is smaller than said upper level opening degree thereby keeping the load of the refrigeration cycle within predetermined operating limits.

2. The method according to claim 1, wherein said step of detecting the load of the refrigeration cycle includes a process of detecting the temperature of a coolant ejected from the compressor.

3. The method according to claim 1, wherein said step of detecting the load of the refrigeration cycle includes a process of detecting the magnitude of a current conducted through the compressor.

4. The method according to claim 1, wherein said step of detecting the load of the refrigeration cycle includes a process of detecting the pressure of a coolant ejected from the compressor.

5. The method according to claim 1, wherein said step of increasing the opening degree of the expansion valve includes a process of fully opening the expansion valve.

6. An apparatus for controlling a refrigeration cycle, comprising:
    compressor means for delivering a refrigerant under pressure;
    at least one heat exchanger means for exchanging thermal energy contained in the refrigerant with an ambient atmosphere;
    means for sensing a load on said compressor means;
    means for altering said load on said compressor means; and
    control means for: (1) first controlling said altering means to a first predetermined level to thereby cause said load to assume a first value, (2) controlling said altering means to an open level to decrease the load on said compressor means when a predetermined upper limit of load on said compressor means is sensed by said sensing means, said open level being sufficient to decrease the load of said compressor to a value lower than a predetermined lower limit, (3) storing a value representing the level of said altering means at the point when said upper limit of load is obtained, (4) adjusting the level of said altering means to produce a value which differs from said stored value by a predetermined amount, and (5) again repeating said controlling, storing, and adjusting steps until a constant load of proper value is attained.

7. An apparatus as in claim 6 wherein said altering means is an electromotive expansion valve having a valve body defining an internal area and a valve rod which is capable of movement within said valve body, said valve rod being of varying areas, thereby selectively restricting fluid flow through said valve body.

8. A device as in claim 7 wherein said valve rod is formed of step sections with areas that are progressively reduced toward one end thereof.

9. A device as in claim 7 wherein said valve rod has one portion which is formed into a substantially conical shape.

* * * * *